Feb. 2, 1926.
C. SCHRAMM
1,571,347
CUTTING TOOL
Filed July 14, 1922
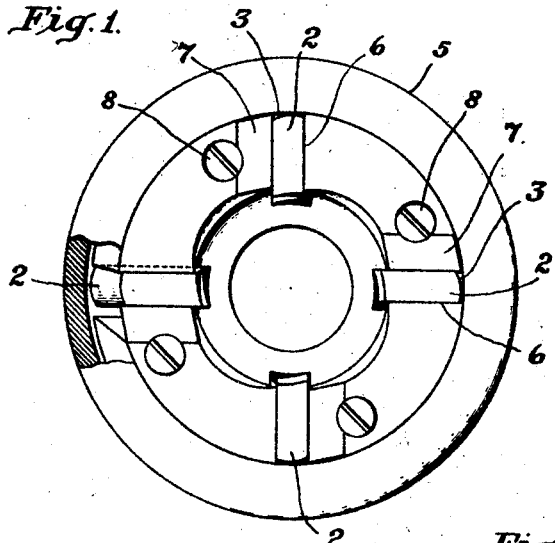
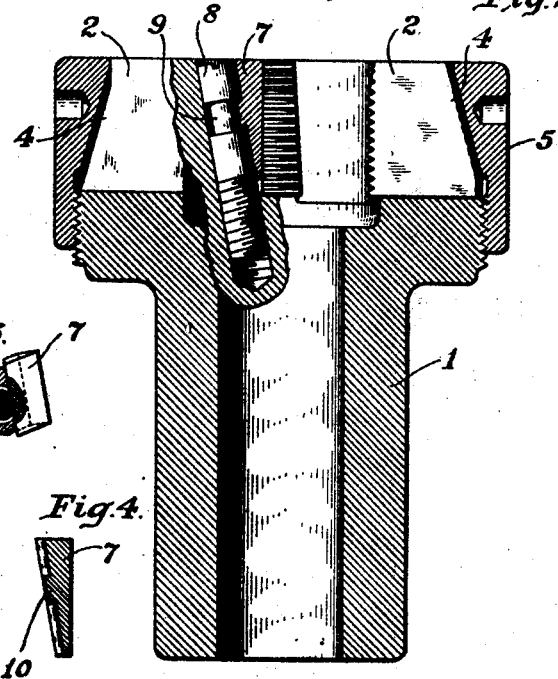
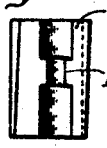
Inventor
Carl Schramm
By Wayne B Wells
Attorney.

Patented Feb. 2, 1926.

1,571,347

UNITED STATES PATENT OFFICE.

CARL SCHRAMM, OF WEST HARTFORD, CONNECTICUT, ASSIGNOR TO PRATT & WHITNEY COMPANY, OF NEW YORK, N. Y., A CORPORATION OF NEW JERSEY.

CUTTING TOOL.

Application filed July 14, 1922. Serial No. 575,028.

*To all whom it may concern:*

Be it known that I, CARL SCHRAMM, a citizen of the United States, residing at West Hartford, in the county of Hartford and State of Connecticut, have invented certain new and useful Improvements in Cutting Tools, of which the following is a specification.

My invention relates to cutting tools and particularly to dies for cutting threads.

One object of my invention is to provide a cutting tool that shall be provided with adjustable cutting members and new and improved means for securing the cutting members in any set position.

In a die constructed in accordance with my invention, the chaser members are fitted to slots formed in a body member, in the usual manner, and are jointly adjusted by means of a suitable adjusting ring. The ring is attached to the body member of the die and engages all of the chaser members. A wedge member is fitted to the body portion of the die adjacent to each chaser member and preferably each wedge member engages an adjacent chaser member along a plane parallel to the axis of the die. The tapered portion of each wedge member engages the screw member which is threadably connected to the body portion of the die. A projecting portion of the wedge member is fitted to a groove formed in the associated screw member in order to compel movement of the wedge member in accordance with any axial movement of the screw member. It should be noted the wedge members does not surround the screw member and is only in engagement with a portion of the circumference of the screw member. The various parts of the die may be easily assembled and moreover it is possible to form the screw member in one piece.

Heretofore, in some cases, it has been proposed to project the screw member through the associated wedge member and provide a collar on the screw member at each side of the wedge member. By such means, the screw member is securely connected to the wedge member but can not be assembled with the ease of a die which is constructed in accordance with my invention. The screw member must at least comprise two pieces, namely, the body portion of the screw and a removable collar which must be mounted upon it.

Although I have illustrated my invention by means of a die for forming threads, it is to be understood that my invention is equally applicable to many other types of cutting tools such, for instance, as milling cutters. The applicability to milling cutters of a fastening means such as disclosed in this application is clearly illustrated in the companion application of P. F. Vokal et al. Serial No. 550,323, filed April 7, 1922.

In the accompanying drawing:

Figure 1 is a plan view of a thread die formed in accordance with my invention.

Fig. 2 is a sectional elevational view of the thread die shown in Fig. 1.

Figs. 3 and 4 are respectively side elevational and sectional views of a wedge member for holding the chaser members in position.

Fig. 5 is a plan view of a wedge member and a screw member.

Referring to the drawing, a thread die is shown comprising a body member 1 and four chaser members 2. The chaser members 2 are fitted to slots 3 formed in the body member 1 and the ends 4 of the chaser members are tapered in the usual manner. Such tapered ends 4 of the chaser members are engaged by an adjusting ring 5 as is customary in such tools. The adjusting ring 5 is threadably connected to the body member 1 of the die and, in accordance with the usual practice, serves to simultaneously adjust the position of all of the chaser members. Preferably each chaser member is provided with a very slight taper on the side 6 which is disposed in direct contact with the body member 1.

A wedge member 7 is fitted to the body member 1 adjacent to each chaser member 2. The surface of engagement between each wedge member and the associate chaser member is preferably parallel to the axis of the tool. A screw member 8 is secured to the body member 1 adjacent to each wedge member 7. Each screw member has a groove 9 formed in it. A portion of the tapered surface on each wedge member 7 is formed to fit the associated screw member 8. Thus, a projecting portion 10 on each wedge member is fitted to the slot 9 in the associate screw member 8 and accordingly the wedge member is compelled to follow the axial movements of the screw member.

In a tool constructed as above set forth, it is apparent that axial movement of the screws 8, which are threadably connected to the body member 1, compels movement of the wedge members therewith. The screw members are fitted to the body member parallel to the tapered surface on the wedge members and accordingly movement of the screw member either forces the associate wedge member firmly into engagement with the chaser member or loosens the wedge members from the associated chaser members. In such manner, it is apparent the chaser member may be held in set position after being adjusted by the adjusting ring 5.

It will be understood that such changes and modifications may be made in my invention as fall within the limits of the appended claims.

What I claim is:

1. In a cutting tool, the combination comprising a body member, a cutting member fitted to the body member, a holding member associated with the cutting member, a single piece fastening member in engagement with the holding member, and means comprising an intermediate groove formed in the single piece fastening member and a projecting portion on the holding member for compelling movement of the holding member in accordance with longitudinal movements of the fastening member.

2. In a cutting tool, the combination comprising a body member, a cutting member fitted to a slot in said body member, a wedge member mounted on the body member in engagement with said cutting member, and a unitary fastening member for securing the wedge member to the body member and for holding the associated cutting member in position, said wedge member having a projecting portion fitted to a portion of the groove formed in the fastening member to compel movement of the wedge member in accordance with the movement of the fastening member.

3. In a cutting tool, the combination comprising a body member, a plurality of cutting members, a wedge member mounted adjacent to each cutting member, a single piece screw member mounted adjacent to each wedge member and threadably connected to the body member, each of said screw members having an intermediate groove formed in it and each wedge member being fitted to a portion of the associated screw member and having a projecting portion fitted to a portion of the groove formed in the screw member.

4. In a cutting tool, the combination comprising a body member, a cutting member mounted in a slot formed in the body member, a wedge member mounted adjacent to the cutting member, the surface of engagement between the wedge member and the cutting member being substantially parallel to the axis of the tool, a screw member threadably connected to the body member and having the axis thereof parallel to the inclined surface of the wedge member, said screw member having an intermediate groove formed therein and said wedge member having a projecting portion fitted to a portion of the groove in the screw member.

5. In a thread die, the combination comprising a body member, a plurality of chaser members fitted to slots formed in the body member, a wedge member fitted to the body member adjacent to each chaser member, and a screw member threadably connected to the body member adjacent to each wedge member, each wedge member having a tapered portion engaging a portion of the associated screw member and a projecting portion fitted to an intermediate groove formed in the associated screw member.

In testimony whereof, I hereto affix my signature.

CARL SCHRAMM.